March 19, 1940.  R. R. WILLIAMS  2,194,190
PYRIMIDINE COMPOUND
Original Filed Dec. 23, 1936
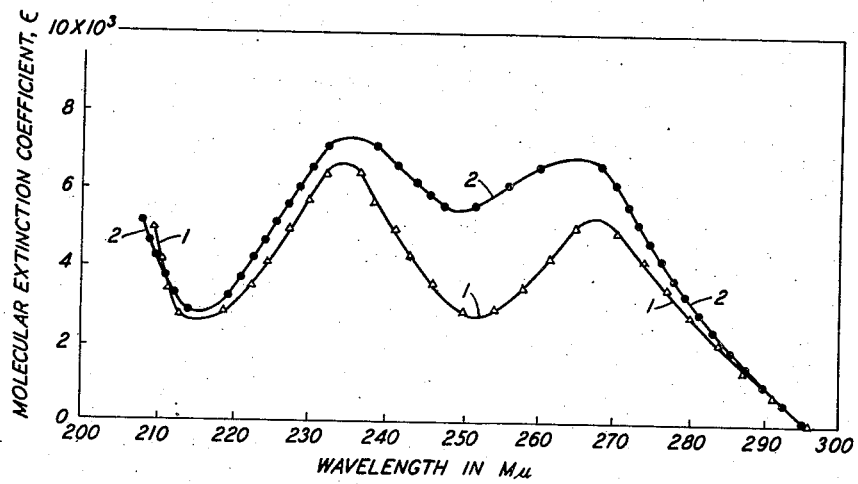
1. 2-METHYL-5-AMINO-METHYL-6-AMINO-PYRIMIDINE
2. 2,5-DIMETHYL-6-AMINO-PYRIMIDINE
INVENTOR
R. R. WILLIAMS
BY
ATTORNEY Patented Mar. 19, 1940

2,194,190

UNITED STATES PATENT OFFICE 2,194,190

PYRIMIDINE COMPOUND

Robert R. Williams, Roselle, N. J., assignor to Research Corporation, New York, N. Y., a corporation of New York Original application December 23, 1936, Serial No. 117,417. Divided and this application November 6, 1937, Serial No. 173,147

2 Claims. (Cl. 260—251)

This invention relates to the production of pyrimidine compounds akin to the pyrimidine portion of vitamin $B_1$.

This application is a division of my copending application Serial No. 117,417, filed December 23, 1936.

Vitamin $B_1$, also known as the antineuritic vitamin, is a component of many natural food stuffs, which is essential for the growth and well being of animals, including man. It is also useful in the treatment of diseases, notably beriberi. Pyrimidine compounds of the type disclosed herein are useful in the synthetic production of vitamin $B_1$ and related compounds having similar physiological properties. The structure of vitamin $B_1$ is discussed in articles by R. R. Williams et al. published in the Journal of the American Chemical Society vol. 57, p. 229, 517, 536, 1093, 1731, 1849, 1876 and 1887 (1935); vol. 58, p. 1063 and 1504 (1936).

Vitamin $B_1$ is made up of a pyrimidine derivative and a thiazole derivative in chemical combination. The pyrimidine portion of the antineuritic vitamin comprises the group

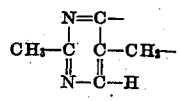

and the objects of the present invention are to provide monocylic pyrimidine compounds comprising this group and to provide methods of making such pyrimidine compounds.

The above described and other objects and features of the invention will be apparent from the following detailed description of specific embodiments thereof, together with the accompanying drawing in which the single figure represents typical absorption spectra in the ultra violet range of two pyrimidine compounds embodying the invention.

One substance embraced within the invention is 2-methyl-5-amino-methyl-6-amino-pyrimidine. This compound possesses the structural formula:

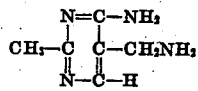

For the production of 2-methyl-5-amino-methyl-6-amino-pyrimidine 300 mgs. of vitamin $B_1$ chloride hydrochloride are dried to constant weight in vacuo at 900° C., approximately 5 cc. of anhydrous ammonia are added thereto, the vessel is sealed and allowed to stand at room temperature for about forty-eight hours. The ammonia is then evaporated off, the residue is treated with 2 to 3 cc. of 10% sodium hydroxide and the alkaline solution is extracted about ten times with 20 to 25 cc. of chloroform each time.

According to one procedure the combined chloroform extracts are extracted with dilute hydrochloric acid and the aqueous solution is evaporated to dryness, the residue is dissolved in a minimum quantity of absolute alcohol and filtered from any undissolved residue. To the alcoholic solution about 10 volumes of absolute ether are added whereupon after one to two days' standing the hydrochloride of 2-methyl-5-amino-methyl-6-amino-pyrimidine separates as needle crystals.

According to another procedure, the above mentioned chloroform extracts are evaporated to dryness leaving a residue of reddish brown gum which crystallizes after two to four days' standing in a dry atmosphere. The crystals which consist of 2-methyl-5-amino-methyl-6-amino pyrimidine in an impure state are partially purified by washing them with a mixture of about 2 cc. of petroleum ether and 1 cc. of absolute alcohol which dissolves most of the adhering gum and leaves most of the crystals undissolved. The crystals are further purified by recrystallization of the free base from hot absolute alcohol or by dissolving in dilute hydrochloric acid to convert the base to the hydrochloride, evaporating to dryness, dissolving the resulting hydrochloride in absolute alcohol and inducing crystallization by adding ether as above described in the first procedure.

The crystalline hydrochloride of 2-methyl-5-amino-methyl-6-amino-pyrimidine obtained by either of the foregoing methods is converted to the free base by dissolving in a slight excess of dilute sodium hydroxide, extracting repeatedly with chloroform, drying the chloroform solution over anhydrous potassium carbonate and evaporating it to dryness. The resulting residue is dissolved in a minimum amount of methyl alcohol and petroleum ether is added till turbidity appears. On standing two to four days the crystalline free base of 2-methyl-5-amino-methyl-6-amino-pyrimidine separates. It may be further purified by dissolving in a minimum amount of hot absolute alcohol and allowing the solution to stand in a dry atmosphere for twenty-four hours. The crystals melt at 211 to 215° C. and after heating at 100° C. in vacuo to expel any carbon dioxide absorbed from the atmosphere analyse for the composition $C_6H_{10}N_4$. Addition of aqueous picric acid to an aqueous solution of the base produces a crystalline picrate melting at 224 to 225° C. and analysing for the composition $C_{18}H_{16}N_{10}O_{14}$.

The invention also contemplates the production of the material known as 2,5-dimethyl-6-amino-pyrimidine and intermediates for the production thereof. The structural formula of this compound is

and a method of preparing it is as follows:

42 g. of ethyl sodioformyl propionate described in the American Chemical Journal 43, 30 (1910) are dissolved in 200 cc. of water and 26 g. of acetamidine hydrochloride are dissolved with shaking. The solution is allowed to stand for about forty-eight hours, then evaporated on the steam bath until crystals begin to appear, then made faintly alkaline with ammonia and extracted repeatedly with chloroform. The chloroform extract is dried over anhydrous sodium sulfate and the chloroform evaporated in vacuo. The solid residue consisting of impure 2,5-dimethyl-6-oxy-pyrimidine is purified by sublimation at less than 1 mm. pressure at about 125° C. and the sublimate is recrystallized from hot acetone. The product consisting of long needles melts at 174° C. This product is converted to 2,5-dimethyl-6-chlor-pyrimidine by warming under a reflux condenser with 100 cc. of phosphorus oxychloride for one-half hour. The excess phosphorus oxychloride is removed by evaporating in vacuo and the tarry residue is mixed with crushed ice until dissolved. The solution is kept cold and made alkaline with sodium hydroxide and extracted with chloroform. The chloroform extract is dried over anhydrous sodium carbonate and evaporated to dryness in vacuo. The residue is distilled at 40 mm. pressure and the product boiling at 100° C. is nearly pure 2,5-dimethyl-6-chlor-pyrimidine.

This product is digested with an excess of a saturated solution of ammonia in alcohol at 125° C. for seven hours in a sealed tube. The reaction mixture is evaporated to dryness and the residue dissolved in a minimum amount of water, cooled in an ice bath and treated with an excess of solid potassium hydroxide which precipitates out the product 2,5-dimethyl-6-amino-pyrimidine. This is dried and purified by subliming in vacuo at less than 1 mm. pressure at about 80° C. The melting point of the resulting white crystals is 201 to 202° C.

All of the above mentioned pyrimidine compounds comprises the group

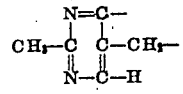

previously unknown to science, and exhibit kindred two banded absorptions in the ultraviolet of the type shown in the drawing. The spectrum designated by the numeral 1 in the drawing is that of 2-methyl-5-amino-methyl-6-amino-pyrimidine, and the one designated by the numeral 2 is that of 2,5-dimethyl-6-amino-pyrimidine.

What is claimed is:
1. The compound

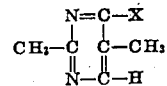

in which X is a halogen.

2. The compound

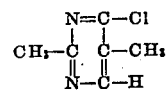

ROBERT R. WILLIAMS.